United States Patent [19]
Aaker et al.

[11] Patent Number: 6,067,303
[45] Date of Patent: May 23, 2000

[54] METHOD AND APPARATUS FOR DETECTING AND CONTROLLING DATA STREAM SPLICING IN ATM NETWORKS

[75] Inventors: Kenneth Dale Aaker; Gary Scott Delp; David Richard Poulter, all of Rochester; Albert Alfonse Slane, Oronoco, all of Minn.

[73] Assignee: International Business Machines Corporation, Armonk, N.Y.

[21] Appl. No.: 08/805,982

[22] Filed: Feb. 25, 1997

[51] Int. Cl.⁷ .............................. H04J 3/24; H04L 12/56
[52] U.S. Cl. ......................... 370/474; 370/394; 370/522
[58] Field of Search ................................ 370/394, 395, 370/466, 473, 474, 522; 348/9, 464, 465, 7

[56] References Cited

U.S. PATENT DOCUMENTS

| | | | |
|---|---|---|---|
| 5,467,342 | 11/1995 | Logston et al. | 370/17 |
| 5,481,312 | 1/1996 | Cash et al. | 348/466 |
| 5,533,021 | 7/1996 | Branstad et al. | 370/60.1 |
| 5,535,216 | 7/1996 | Goldman et al. | 370/503 |
| 5,537,408 | 7/1996 | Branstad et al. | 370/79 |
| 5,544,161 | 8/1996 | Bigham et al. | 370/58.1 |
| 5,650,825 | 7/1997 | Naimpally et al. | 348/465 |
| 5,652,615 | 7/1997 | Bryant et al. | 348/9 |
| 5,652,749 | 7/1997 | Davenport et al. | 370/466 |
| 5,659,539 | 8/1997 | Porter et al. | 709/231 |
| 5,859,660 | 1/1999 | Perkins et al. | 348/9 |
| 5,898,695 | 4/1999 | Fujii et al. | 370/464 |
| 5,930,252 | 7/1999 | Aaker et al. | 370/395 |

FOREIGN PATENT DOCUMENTS

0723345A2 7/1996 European Pat. Off. .

OTHER PUBLICATIONS

"SPECS Technology" CableLabs; Jan. 1995—vol. 7, No. 1.
"Performability–based Quality of Service Metrics for Communication Services", Manish Malhotra and Malathl Veeraraghavan; AT&T Bell Labs, Holmdel, NJ 07733.
"Magnitude Technical White Paper", Miralite Communications; P714.474.1900*F714.474.1885*Etim@miralite.com.
"MPEG–2".
"Sun sets on monolithic microprocessors; action is shifting to CPU as a core embedded in an ASIC" by Ron Wilson Electrical Engineering Times, No. 853, p. 73(3), Jun. 19, 1995.
"When is the future?" Panel Discussion; Multichannel News, vol. 15, No. 24, p. 16A(4), Jun. 13, 1994.
ITU–T Recommendation H.222.0–ISO/IEC 13818–1 (1995); Generic Coding of Moving Pictures and Associated Audio Information: Systems, International Organization for Standardisation, Organization Internationale De Normalisation (ISO/IEC JTC1/SC29/WG11).

*Primary Examiner*—Hassan Kizou
*Assistant Examiner*—John Pezzlo
*Attorney, Agent, or Firm*—John Pennington

[57] ABSTRACT

A method and apparatus are provided for detecting and controlling data stream splicing in a stream of multimedia digital data over a distribution communications network. Sequential transport stream packets are obtained. Predetermined fields of each transport stream packet are interrogated to identify a splice in the data stream. A predetermined task is initiated responsive to an identified splice. In accordance with feature of the invention, one predetermined task initiated responsive to the identified splice includes masking the interrogated predetermined fields to mask the splice in the data stream.

12 Claims, 12 Drawing Sheets

TRANSPORT STREAM PACKET LAYER 150

| SYNTAX | NO. OF BITS |
|---|---|
| TRANSPORT_PACKET(){ | |
| SYNC_BYTE | 8 |
| TRANSPORT_ERROR_INDICATOR | 1 |
| PAYLOAD_UNIT_START_INDICATOR | 1 |
| TRANSPORT_PRIORITY | 1 |
| PID | 13 |
| TRANSPORT_SCRAMBLING_CONTROL | 2 |
| ADAPTATION_FIELD_CONTROL | 2 |
| CONTINUITY_COUNTER | 4 |
| IF (ADAPTATION_FIELD_CONTROL = "10" IF ADAPTATION FIELD CONTROL = "11"){ | |
| ADAPTATION FIELD() | |
| } | |
| IF (ADAPTATION FIELD CONTROL = "01" IF ADAPTATION FIELD CONTROL = "11"){ | |
| FOR (I=0;I<N;I++)} | |
| DATA_BYTE | 8 |
| } | |
| } | |

FIG.1B

TRANSPORT STREAM ADAPTATIONFIELD 160

| SYNTAX | NO. OF BITS |
|---|---|
| ADAPTATION_FIELD() { | |
|   ADAPTATION_FIELD_LENGTH | 8 |
|     IF (ADAPTATION_FIELD > 0) { | |
|       DISCONTINUITY_INDICATOR | 1 |
|       RANDOM_ACCESS_INDICATOR | 1 |
|       ELEMENTARY_STREAM_PRIORITY_INDICATOR | 1 |
|       PCR_FLAG | 1 |
|       OPCR_FLAG | 1 |
|       SPLICING_POINT_FLAG | 1 |
|       TRANSPORT_PRIVATE_DATA_FLAG | 1 |
|       ADAPTATION_FIELD_EXTENSION_FLAG | 1 |
| | |
|     IF(PCR FLAG = "1") { | |
|       PROGRAM_CLOCK_REFERENCE_BASE | 33 |
|       RESERVED | 6 |
|       PROGRAM_CLOCK_REFERENCE_EXTENSION} | 9 |
| | |
|     IF (OPCR FLAG = "1") { | |
|       ORIGINAL_PROGRAM_REFERENCE_BASE | 33 |
|       RESERVED | 6 |
|       ORIGINAL_PROGRAM_REFERENCE_EXTENSION | 9 |
| | |
|     IF(SPLICE_POINT_FLAG='1'){ | |
|       SPLICE COUNTDOWN} | 8 |
| | |
|     IF (TRANSPORT PRIVATE DATAFLAG = "1") { | |
|       TRANSPORT PRIVATE DATA LENGTH | 8 |
|       FOR (I=0;I<TRANSPORT_PRIVATE_DATA_LENGTH;I++){ | |
|       PRIVATE_DATA_BYTE | 8 |
|       * | |
|       * | |
|       * | |

FIG.1C

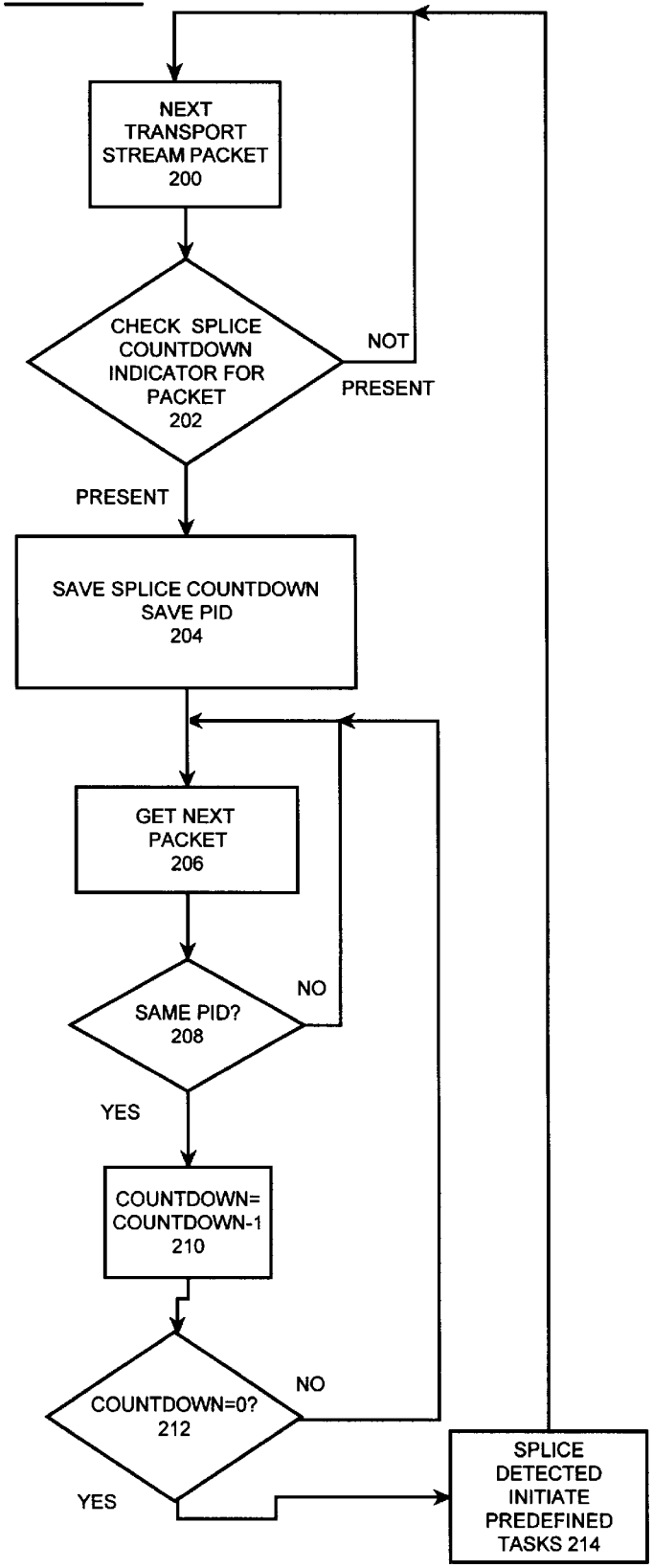

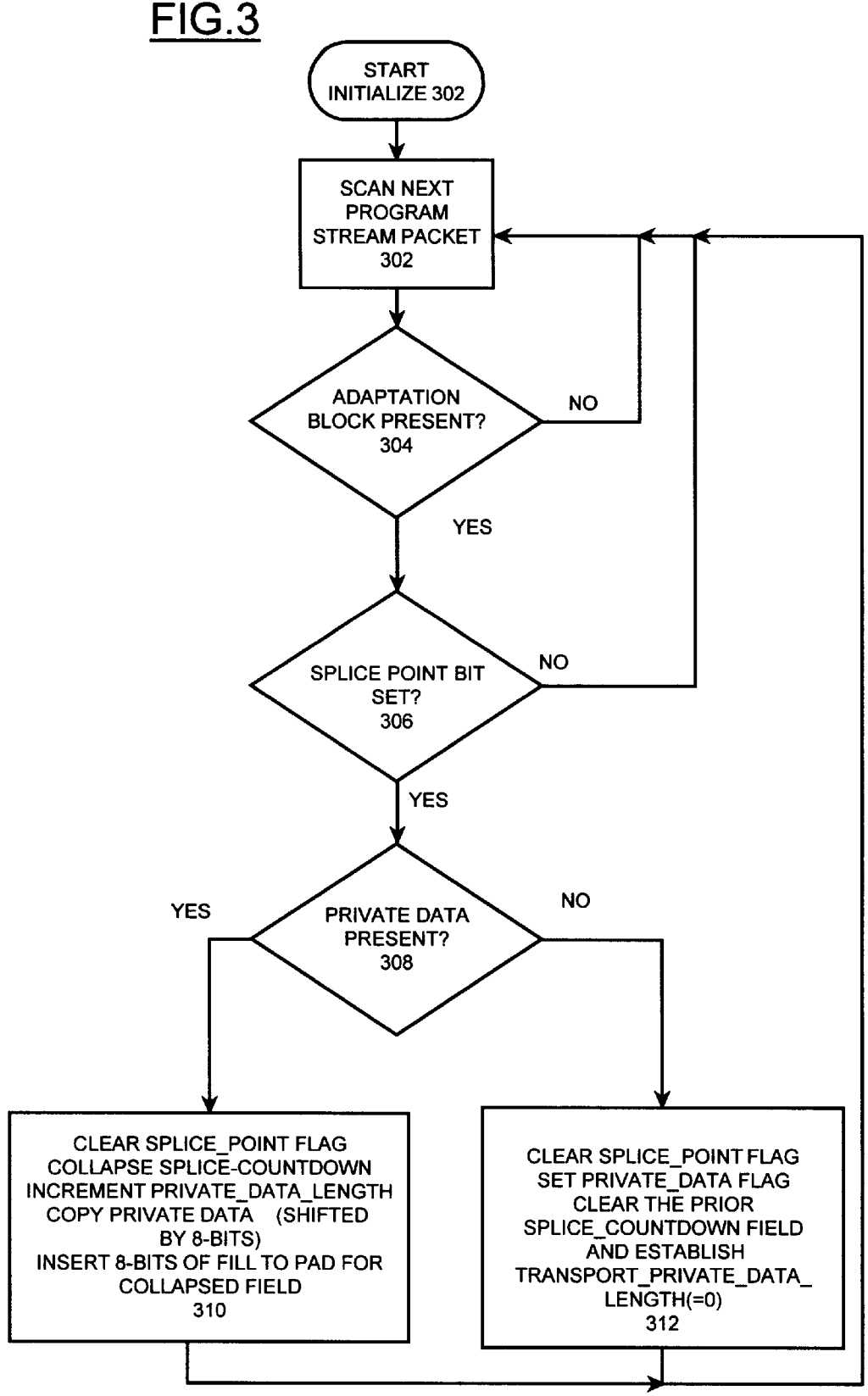

| PCR INPUT | 5 | 6 | 7 | 8 | 11 | 12 | 13 | 14 | 15 | 2 | 3 | 4 |
|---|---|---|---|---|---|---|---|---|---|---|---|---|
| DISCONTINUITY | 1 | 0 | 0 | 0 | 1 | 0 | 0 | 0 | 0 | 1 | 0 | 0 |
| LOCAL TIME | 1 | 2 | 3 | 4 | 5 | 6 | 7 | 8 | 9 | 10 | 11 | 12 |
| OFFSET | 4 | 4 | 4 | 4 | 6 | 6 | 6 | 6 | 6 | -8 | -8 | -8 |
| CORRECTION | 0 | 0 | 0 | 0 | -2 | -2 | -2 | -2 | -2 | 12 | 12 | 12 |
| OUTPUT | 5 | 6 | 7 | 8 | 9 | 10 | 11 | 12 | 13 | 14 | 15 | 16 |
| DISCONTINUITY | 0 | 0 | 0 | 0 | 0 | 0 | 0 | 0 | 0 | 0 | 0 | 0 |

NEW PCR CORRECTION CALCULATED AT EACH DISCONTINUITY = OLD CORRECTION - (NEW OFFSET - OLD OFFSET)

METHOD AND APPARATUS FOR DETECTING AND CONTROLLING DATA STREAM SPLICING IN ATM NETWORKS

FIELD OF THE INVENTION

The present invention relates to the data processing field, and more particularly, relates to a method and apparatus for detecting and controlling data stream splicing across data communications networks including asynchronous transfer mode (ATM) networks, for example, to support such applications as initiating set tasks responsive to detecting insertion points, such as commercials in a MPEG-2 data stream.

DESCRIPTION OF THE PRIOR ART

The MPEG-2 Standard is defined by the Moving Picture Experts Group (ISO/IEC JTC1/SC29/WG11). The standard supports constant and/or variable rate encoding that allows for variable bandwidth and quality of video streams. It also defines a system layer that integrates multiple media sources into a single data stream with integrated time stamps. The systems layer supports the sending of information encoded using a variety of video and audio data compression techniques such as MPEG1 or MPEG-2 video or audio. The MPEG-2 standard has defined a system layer that integrates multiple media sources into a single data stream with integrated time stamps or program clock references (PCRs).

The Motion Pictures Experts Group (MPEG) standard for MPEG-2 stream transport is described in ITU-T Recommendation H.222.0-ISO/IEC 13818-1 (1995) Generic Coding of Moving Pictures and Associated Audio Information: Systems, International organization for Standardisation, Organization Internationale De Normalisation (ISO/IEC JTC1/SC29/WG11).

The MPEG-2 Systems Standard specifies how to combine multiple audio, video, and private-data streams into a single multiplexed stream. It performs packetized stream control/synchronization and is designed to support a wide range of broadcast, telecommunications (interactive), computing, and storage application.

Effort has been expended with the current analog technology to sense the insertion of material, such as commercials into the main programming. As technology increases, it is expected that the Asynchronous Transfer Mode (ATM) technology and ATM networks will supply much of the need for high speed multimedia.

In the data processing field, arrangements are known for splicing data streams over asynchronous transfer mode (ATM) networks. ATM technology provides mechanisms for additional servers to insert or splice additional media streams into the main programming. For example, U.S. patent application Ser. No. 08/763,524, filed Dec. 11, 1996, and entitled METHOD AND APPARATUS FOR QUEUING AND TRIGGERING DATA FLOW FOR ATM NETWORKS, discloses method and apparatus for queuing and triggering the flow of data across data communications networks including ATM networks, for example, to support such applications as inserting commercials into a MPEG-2 data stream. This patent application describes ATM technology related triggers that are used in conjunction with the MPEG-2 insertion points that make real time stream splicing possible.

Some of these additional streams may be unwanted by the receiving end user, such as a commercial inserted in a program. Downstream servers may want to detect this insertion point and insert their own stream, for example, a local commercial instead of a national advertisement. Also it is desirable in some instances to mask an insertion point to prevent a downstream server from detecting an insertion point and inserting their own stream.

It would be advantageous to have a method and apparatus for detecting and controlling data stream splicing in a stream of multimedia digital data over a distribution communications network.

SUMMARY OF THE INVENTION

Important objects of the present invention are to provide an improved method and apparatus for detecting and controlling data stream splicing in a stream of multimedia digital data over a distribution communications network; to provide such method and apparatus substantially without negative effects and that overcome some disadvantages of prior art arrangements.

In brief, method and apparatus are provided for detecting and controlling data stream splicing in a stream of multimedia digital data over a distribution communications network. Sequential transport stream packets are obtained. Predetermined fields of each transport stream packet are interrogated to identify a splice in the data stream. A predetermined task is initiated responsive to an identified splice. In accordance with feature of the invention, one predetermined task initiated responsive to the identified splice includes masking the interrogated predetermined fields to mask the splice in the data stream.

BRIEF DESCRIPTION OF THE DRAWING

The present invention together with the above and other objects and advantages may best be understood from the following detailed description of the preferred embodiments of the invention illustrated in the drawings, wherein:

FIG. 1B is a chart illustrating a transport stream packet of the preferred ATM communications network system of the preferred embodiment of FIG. 1;

FIG. 1C is a chart illustrating a transport stream adaptation field of the preferred ATM communications network system of the preferred embodiment of FIG. 1;

FIGS. 2A and 2B are flow charts illustrating exemplary logical steps to detect splicing performed by a splicing detection and control mechanism of the preferred ATM communications network system of the preferred embodiment of FIG. 1;

FIG. 3 is a flow chart illustrating exemplary logical steps to mask splicing performed by a splicing detection and control mechanism of the preferred ATM communications network system of the preferred embodiment of FIG. 1;

FIG. 7A is a chart illustrating a PCR correction calculation for each discontinuity indicator in a masked stream of multimedia digital data of the preferred embodiment;

DETAILED DESCRIPTION OF THE PREFERRED EMBODIMENTS

Figure 1A:
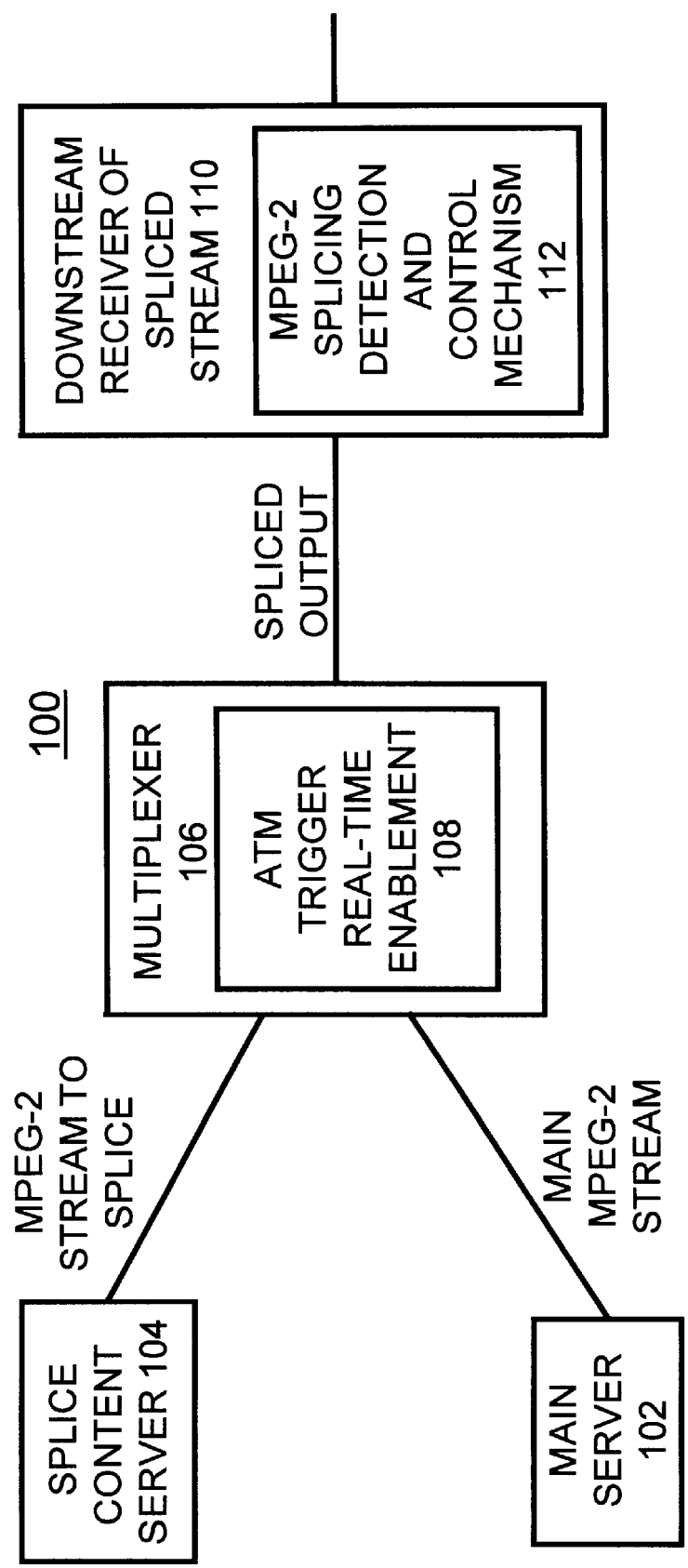
FIG. 1A is a block diagram representation of a preferred ATM communications network system of the preferred embodiment.

Having reference now to the drawings, in FIG. 1A, there is shown a preferred ATM communications network system generally designated by the reference character 100 which may be employed to implement the method of the preferred embodiment. The preferred ATM communications network system 100 includes an main server 102 and a splice content server 104 having respective outputs at lines labeled MAIN MPEG-2 STREAM and MPEG-2 STREAM TO SPLICE applied to a multiplexer 106. The multiplexer 106 provides an ATM trigger real-time enablement function 108. The data trigger real-time enablement mechanism advantageously is provided at a low protocol layer to reduce latency. The spliced output of the multiplexer 106 is received by a downstream receiver 110 which includes a splicing detection and control mechanism 112 of the preferred embodiment of the invention. The preferred ATM communications network system 100 is illustrated in simplified and diagrammatic form sufficient for an understanding of the present invention. The utility of the present invention is not restricted to the details of a particular downstream receiver or multiplexer arrangement.

In accordance with the preferred embodiment, the splicing detection and control mechanism 112 utilizes available indicators of a particular communications protocol used for splicing detection and control. MPEG-2 video and audio streams contain mechanisms such as discontinuity indicators and countdown indicators. These mechanisms are used to detect when separate or additional video and audio streams can be inserted, in real time, into the main program stream. The main MPEG-2 stream and any additional MPEG-2 streams are fed to the MPEG-2 multiplexer 106. The streams are then spliced when the discontinuity indicators and countdown indicators allow. The spliced MPEG-2 stream is then supplied by the multiplexer 106 to waiting receivers 110 and possibly other servers.

In accordance with the preferred embodiment, when a splice and splice duration is detected by the splicing detection and control mechanism 112, additional desired tasks are initiated, such as disabling recorders, temporarily blocking the stream feed, or initiating point-to-multipoint activity. Using predefined markers in the data stream, for example, predetermined time indicators and stream progress indicators such as discontinuity fields, a splice or discontinuity of the main data stream is detected as illustrated and described with respect to FIGS. 2A, and 2B. The spliced MPEG-2 data stream output of multiplexer 106 contains discontinuity and countdown indicators. The discontinuity and countdown indicators can be used by the splicing detection and control mechanism 112 advantageously included in any receiver 110 to sense the splice in the main programming. Masking of the predefined markers in the data stream including time stamps, discontinuity and countdown indicators are illustrated and described with respect to FIGS. 3 and 4.

Figure 5:
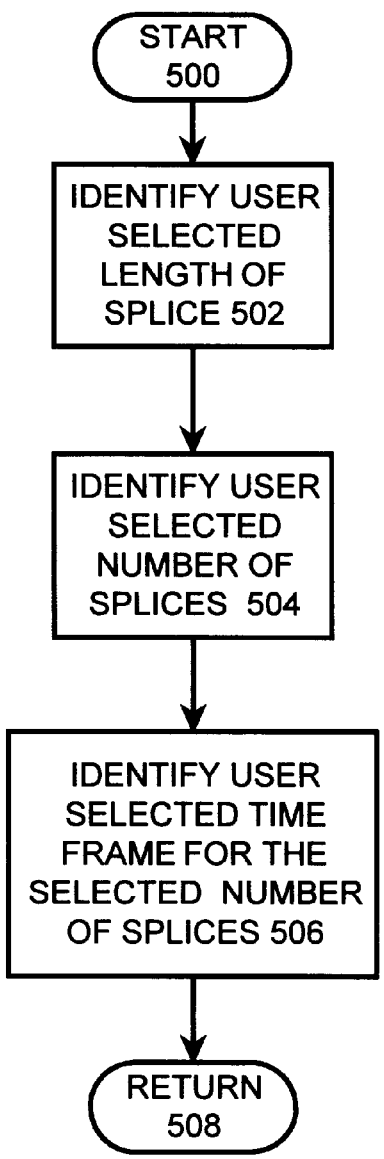
FIGS. 5 and 6 are flow charts illustrating exemplary logical steps for receiving user selections to configure a splicing detection and control mechanism of the preferred embodiment.

User selected parameter values can be used for controlling the splicing detection as illustrated and described with respect to FIG. 5. The transport stream packets are made up of 188 bytes. Though the normal process of layer encapsulation, these 188 bytes are broken up in to 48 byte ATM payloads and 53 byte ATM cells and transmitted on the ATM network system 100. The transport stream packets are reconstructed from ATM cells at appropriate place during data movement, for example, at multiplexers, servers, or receivers. Predefined markers, such as discontinuity fields are then used by the splicing detection and control mechanism 112 of the receiving downstream server 106 to determine when a splice has occurred. Once the splice has been determined, splicing detection and control logic 112 is applied to initiate additional tasks. These tasks include, but are not limited to, such actions as turning off any broadcast equipment that is controlling the output signal, turning off a data stream recorder, or placing a separate MPEG-2 stream in its place, such as a local commercial instead of a national commercial that was in the spliced stream. The detection of these insertion points or splices are used to initiate predetermined user selected tasks, such as predetermined tasks selected by a user as illustrated and described with respect to FIG. 6.

Referring to FIG. 1B, the MPEG-2 standard describes the movement of data by the use of a transport stream packet layer 500. One of the main entities of this layer is the transport packet. The transport packet included multiple, predetermined formatted fields which control the flow of the data. The full definition of these fields is contained in ITU-T Recommendation H.222.0-ISO/IEC 13818-1 (1995) Generic coding of Moving Pictures and Associated Audio Information: Systems, International Organization for Standarclisation, Organization Internationale De Normalisation (ISO/IEC JTC1/SC29/WG11).

Some of the transport_packet fields include a PID identifying the type of data stored in the packet payload, a continuity_counter which is incremented with each transport stream packet with the same PID and wraps to zero after its maximum value, except the continuity_counter is not incremented with predefined values of the adaptation_ field_control. The adaptation_field_control indicates whether this transport stream packet header is followed by an adaptation field and/or payload. The continuity_counter in a particular transport stream packet is continuous when it differs by one increment from the continuity_counter value in the previous transport stream packet of the same PID.

Referring to FIG. 1C, the transport stream adaptation field contains additional flags or indicators about the packet. Some of these fields include a discontinuity_indicator. A continuity_counter discontinuity is indicated by the use of the discontinuity_indicator in any transport stream packet. When the discontinuity state is true in any transport stream packet of a particular PID not designated as a PCR_PID, the continuity_counter in that packet may be discontinuous with respect to the previous transport stream packet of the same PID. When the discontinuity state is true in the transport stream packet of the PID that is designated as a PCR_PID, the continuity_counter may only be discontinuous in the packet in which a system time-base discontinuity occurs. A continuity counter discontinuity point occurs when the discontinuity state is true in a transport stream packet and/or the continuity_counter in the same packet is discontinuous with respect to the previous transport stream packet of the same PID. A splice_point flag field is a 1-bit flag, where a value of 1 indicates that a splice_countdown field shall be present in the associated adaptation field, specifying the current or future occurrence of a splicing point. A value of 0 for the splice_point flag indicates that a splice_ countdown field is not present in the adaptation field.

Another adaptation field, the splice_countdown field is an 8-bit field, representing a value which may be positive or negative. A positive value specifies the remaining number of transport stream packets, of the same PID, following the associated transport stream packet until a splicing point is reached. Duplicate transport stream packets and transport stream packets which only contain adaptation fields are excluded. The splicing point occurs immediately after the transfer of the transport stream packet in which the splice_counter reaches the value zero. In the transport stream packet where the splice_countdown reaches zero, the last byte of the transport stream packet payload shall be the last byte of a coded audio frame or a coded picture. In the case of video, the corresponding access unit may or may not be terminated by a sequence_end_code.

Figure 2B:
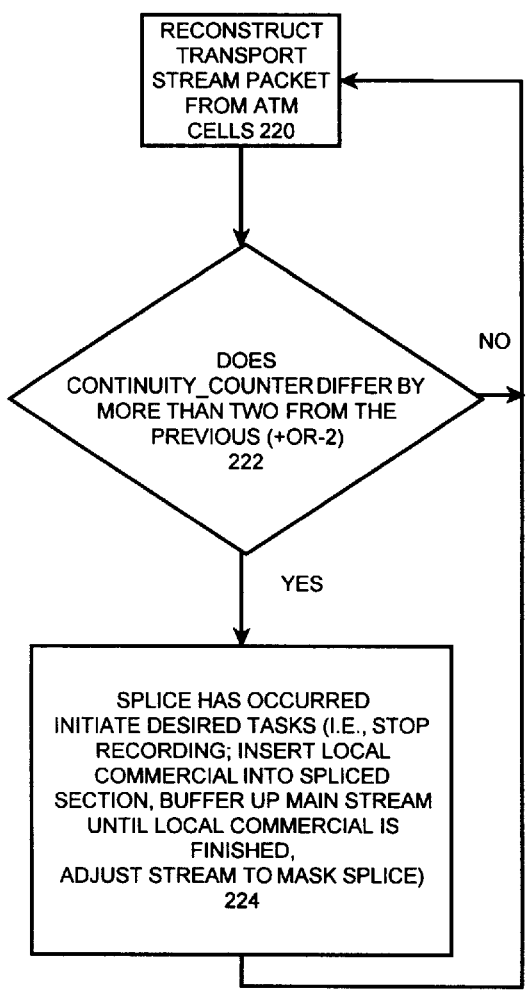

Referring to FIGS. 2A and 2B, exemplary logical steps are shown for splicing detection performed by the splicing detection and control mechanism 112 of the preferred embodiment. Referring initially to FIG. 2A, sequential steps begin with obtaining a next sequential transport stream packet from the data stream as indicated at a block 200 labeled NEXT TRANSPORT STREAM PACKET. The next transport stream packet obtained at block 200 is checked for a splice countdown indicator as indicated at a decision block 202. If a splice countdown indicator is present, it is saved and the PID is saved as indicated at a block 204. Otherwise, if a splice countdown indicator is not present, then the sequential operations return to block 200 to obtain a next transport stream packet. After saving the splice countdown and PID at block 204, a next transport stream packet is obtained as indicated at a block 206. The PID of the transport stream packet obtained at block 206 is checked as indicated at a decision block 208. If the PID is not the same as the previous packet, then the sequential operations return to block 206 to obtain a next transport stream packet. Otherwise if the PID is the same as the previous packet, then the countdown value is decreased by 1 as indicated at a block 210. Then the resulting countdown value is compared with 0 as indicated at a decision block 212. If the countdown value equals 0, then a splice is detected and predefined tasks are initiated as indicated at a block 214. Otherwise if the countdown value does not equal 0, then the sequential operations return to block 206 to obtain a next transport stream packet.

Referring to FIG. 2B, the sequential steps begin as indicated at a block 220 with reconstructing the transport stream packet from ATM cells. Then it is determined whether the continuity_counter differs by more than two from the previous transport stream packet's continuity_counter (+or −2) as indicated at a decision block 222. If so, a splice is detected and predefined tasks are initiated as indicated at a block 224 which include, for example, deleting or ignoring the spliced stream to stop recording; inserting a local commercial into the spliced stream section, buffering main stream until local commercial is finished, and adjusting the data stream to mask splice. Otherwise, if the continuity_counter does not differ by more than two from the previous transport stream packet's continuity_counter, then the sequential operation return to block 220 to reconstruct the next transport stream packet from ATM cells.

Figure 4:
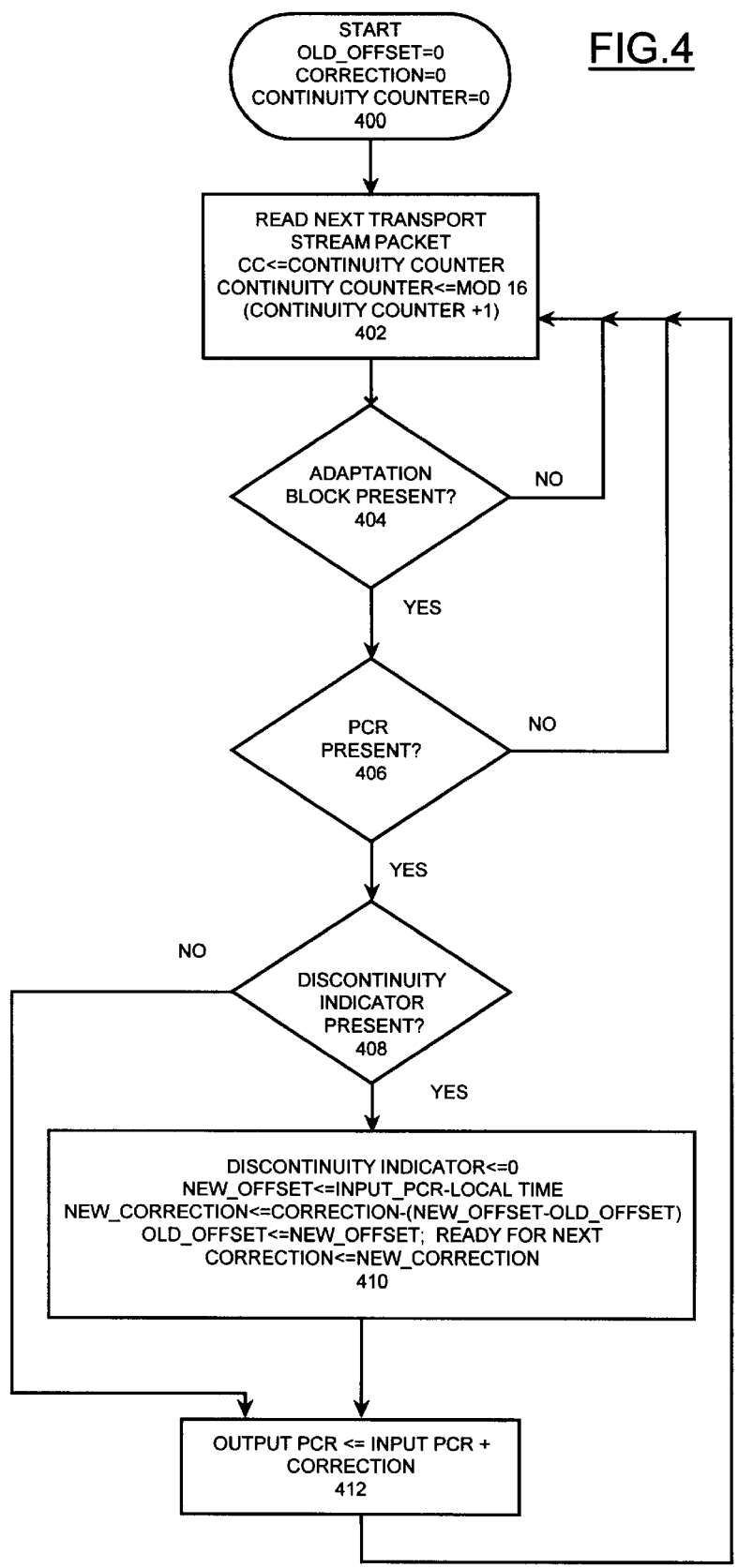
FIG. 4 is a flow chart illustrating further exemplary logical steps to mask splicing performed by a splicing detection and control mechanism of the preferred ATM communications network system of the preferred embodiment of FIG. 1.

FIGS. 3 and 4 illustrate exemplary logical steps performed by the splicing detection and control mechanism 112 of the preferred embodiment to mask splicing. In circumstances where an omission of a spliced stream is undesirable to the transmitter of such a stream, multiplexer 106 or server transmitting or re-transmitting the primary and secondary streams merges the two streams dynamically, generating a new digital video stream that contains no indicators that would indicate the presence of the alternate stream, for example, as illustrated and described with respect to FIGS. 7B and 8B. Referring initially to FIG. 3, the sequential steps begin with initialization as indicated at a block 302. Then a next program stream packet is scanned as indicated at a block 304. Next it is checked whether an adaptation block is present as indicated at a decision block 304. If not, then the sequential steps return to block 304 to scan a next program stream packet. If an adaptation block is present, then it is checked whether a splice point bit is set as indicated at a decision block 306. If not, then the sequential steps return to block 304 to scan a next program stream packet. If the splice point bit is set, it is checked whether private data is present as indicated at a decision block 308. If private data is present, then the splice_point flag is cleared, the splice_countdown field is collapsed, the private_data_length is incremented, and the private data is copied and shifted by 8-bits and 8-bits of fill to pad for the collapsed splice_countdown field is inserted at the end of the private data as indicated at a block 310. If private data is not present, then the splice_point flag is cleared and the private_data flag is set, the prior splice_countdown field is cleared and a transport_private_data_length is established (=0) as indicated at a block 312.

Referring to FIG. 4, sequential operations begin with setting predefined initial values as indicated at a block 400 labeled OLD_OFFSET=0, CORRECTION=0, and CONTINUITY COUNTER=0. A next transport stream packet is read and the continuity counter is incremented as indicated at a block 402. The read process is performed at the base rate of MPEG-2 data stream and the local clock is incremented at a rate which keeps the local clock and MPEG-2 data stream synchronized. Next it is checked whether an adaptation block is present as indicated at a decision block 404. If not, then the sequential steps return to block 402 to read a next program stream packet and the continuity counter is incremented. If an adaptation block is present, then it is checked whether a PCR is present as indicated at a decision block 406. In not, then the sequential steps return to block 402 to read a next program stream packet and the continuity counter is incremented. If a PCR is present, then it is checked whether a discontinuity indicator is present as indicated at a decision block 408. If a discontinuity indicator is present, then the discontinuity indicator is set to zero, a new offset is calculated, a new correction is calculated and set for the correction value, and then the new offset is set for the old offset for calculating a next correction as indicated at a block 410. If a discontinuity indicator is not present and following the calculations at block 410, then an output PCR is calculated equal to the input PCR and the correction. Then the seqiential operations return to block 402.

Figure 6:
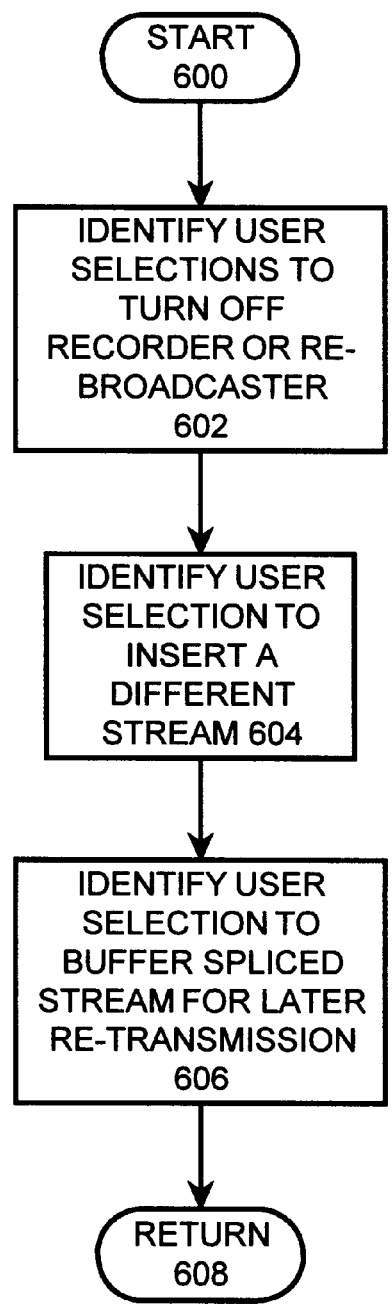

Referring to FIGS. 5 and 6, exemplary logical steps performed by the splicing detection and control mechanism 112 of the preferred embodiment to enable user configurability of the splicing detection and control mechanism 112 are shown. Referring first to FIG. 5, the operator of the down stream receiver 106 containing the splicing detection and control mechanism 112 has the ability to choose what kind of splice will be detected and acted upon. A user selection for length of splice is identified as indicated at a block 502. A number of splices within a time frame is identified as indicated at a block 504. A splice stream type, such as audio or video is identified as indicated at a block 506.

Referring to FIG. 6, the user operator has the ability to decide what actions would be initiated when the splice detection was enabled, such as, turn off recorder or re-broadcaster as indicated at a block 602, insert a different stream as indicated at a block 604, buffer the spliced stream for later re-transmission as indicated at a block 606, and the like.

Referring to FIG. 7A, there is shown a chart illustrating a PCR correction calculation for the discontinuity indicators in a masked stream of multimedia digital data of the preferred embodiment. First an exemplary PCR input, a discontinuity indicator, and a local time are shown. The process is performed at the base rate of MPEG-2 data stream and the local clock is incremented at a rate which keeps the local clock and MPEG-2 data stream synchronized. Next an offset between the PCR input and the local time are shown. The offset if followed by a PCR correction calculation value that is calculated at each discontinuity. As shown in FIG. 7A, the PCR correction calculation value=OLD CORRECTION—(NEW OFFSET—OLD OFFSET). The resulting PCR output and discontinuity indicators included in the masked digital data stream are shown at the bottom of the chart of FIG. 7A.

Figure 7B:
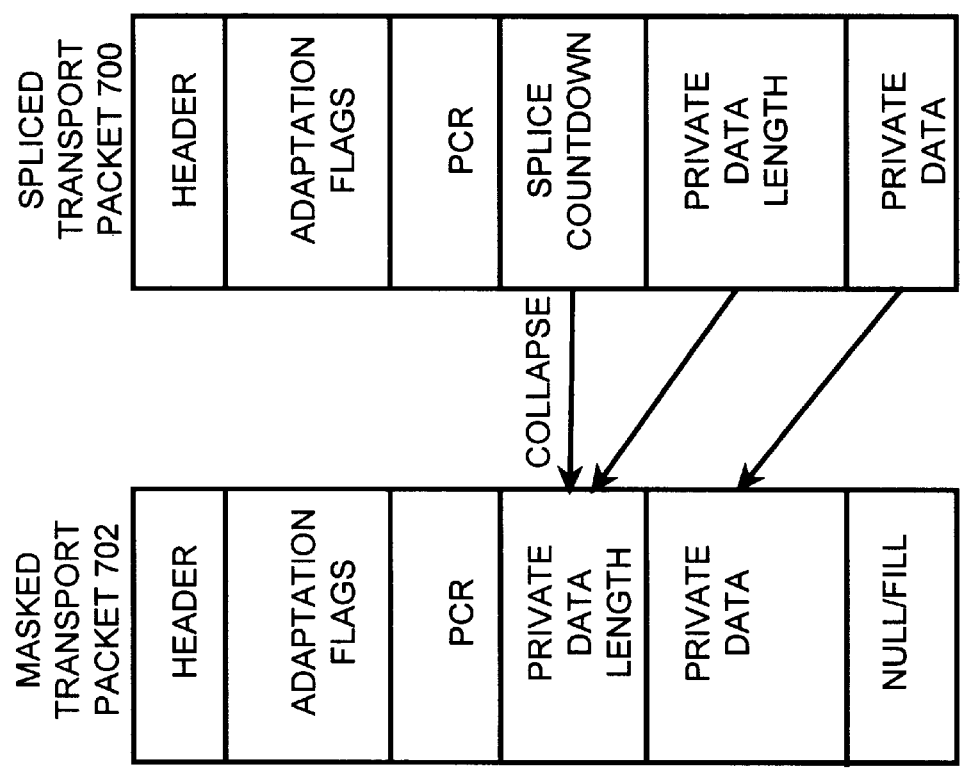
FIG. 7B is a chart illustrating a multimedia digital data stream before and after the masking steps of FIG. 3 or FIG. 4.
Figure 8A:
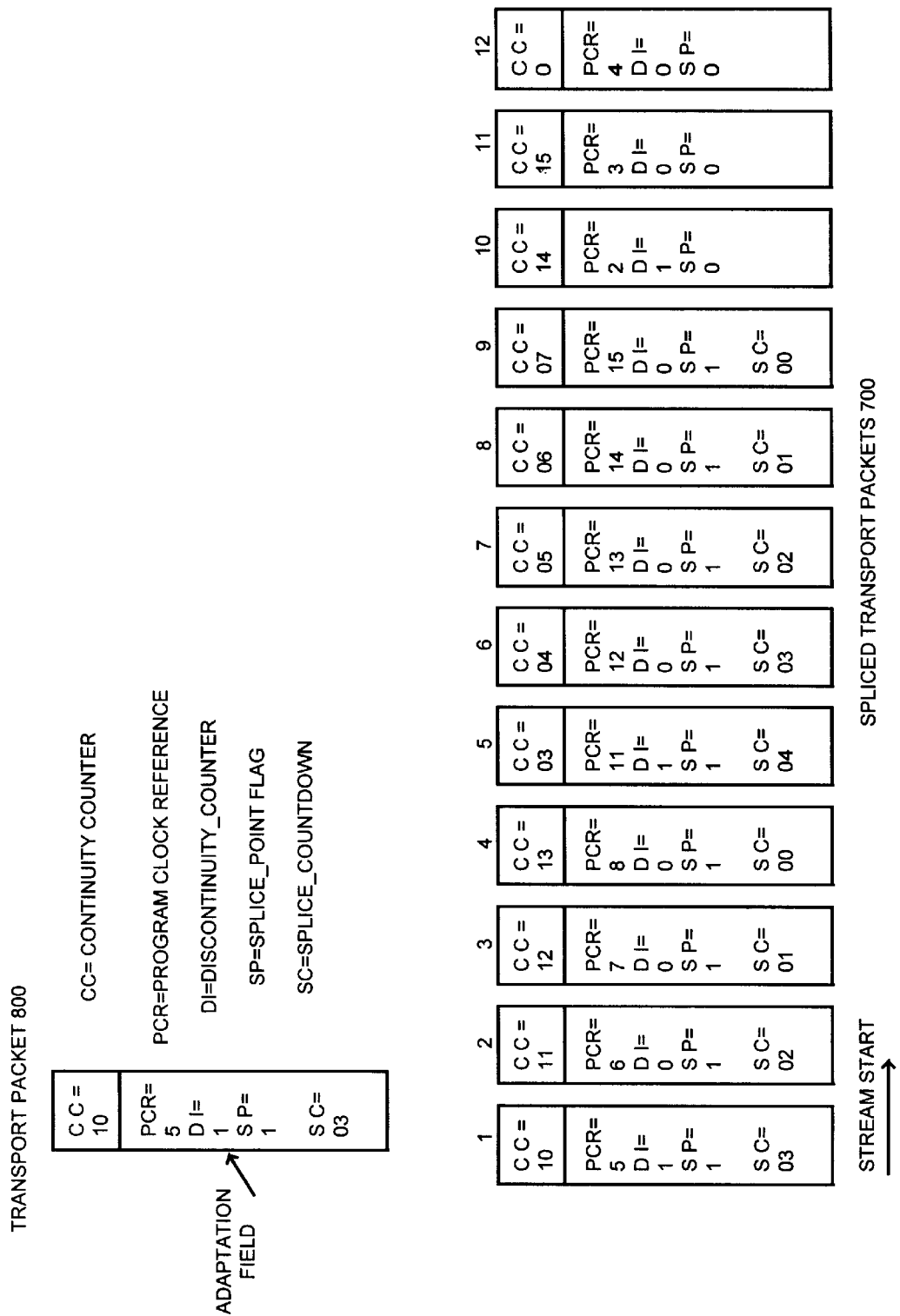
FIG. 8A and 8B are charts respectively illustrating a multimedia digital data stream before and after the masking steps of FIG. 3 or FIG. 4.
Figure 8B:
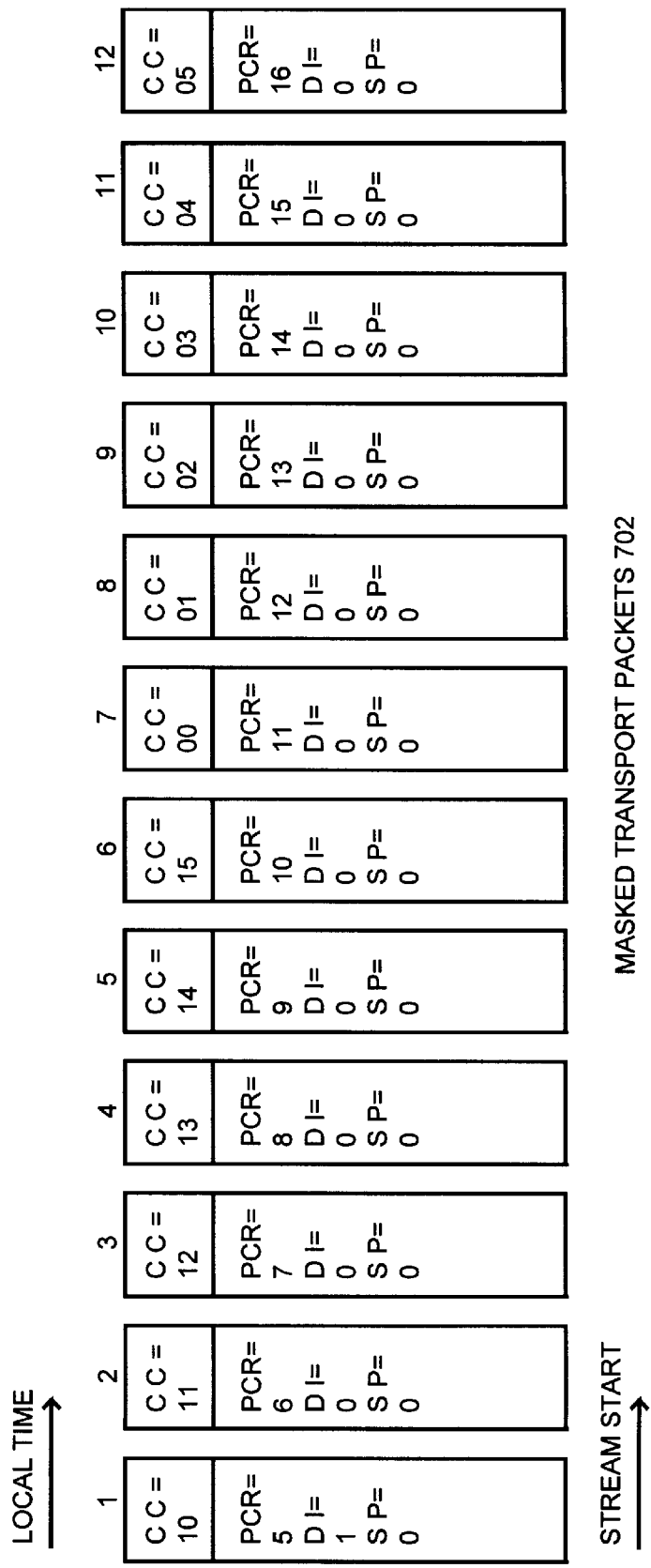

Referring to FIG. 7B, and FIGS. 8A and 8B, there are shown charts respectively illustrating a multimedia digital data stream before and after the masking steps of FIG. 3 or FIG. 4. In FIG. 8A, there is shown a transport packet key 800 for transport packet fields including C C=CONTINUITY COUNTER, and adaptation fields PCR=PROGRAM CLOCK REFERENCE, DI=DISCONTINUITY_ INDICATOR, SP=SPLICE_POINT FLAG, and SC=SPLICE_COUNTDOWN. As shown in FIGS. 7B and 8A, a spliced transport packet 700 includes a splice countdown field after a PCR field and followed by a private data length, and private data. Referring also to FIG. 8B, in a masked transport packet 702, the splice countdown field is eliminated and collapsed with the private data length after a PCR field and followed by private data. As shown in FIG. 7A, null/fill zero stuffing is provided at the end of the masked transport packet 702 of equal length as the eliminated splice countdown field.

Figure 9:
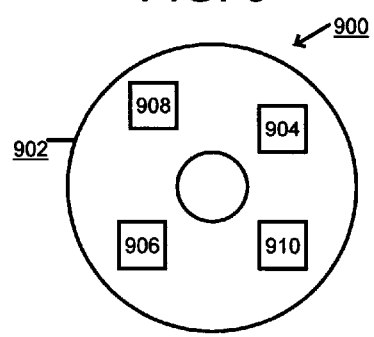
FIG. 9 is a block diagram illustrating a computer program product in accordance with the preferred embodiment.

Referring now to FIG. 9, an article of manufacture or a computer program product 900 of the invention is illustrated. The computer program product 900 includes a recording medium 902, such as, a floppy disk, a high capacity read only memory in the form of an optically read compact disk or CD-ROM, a tape, a transmission type media such as a digital or analog communications link, or a similar computer program product. Recording medium 802 stores program means 904, 906, 908, 910 on the medium 902 for carrying out the methods of this invention in the communications system 100 of FIG. 1.

A sequence of program instructions or a logical assembly of one or more interrelated modules defined by the recorded program means 904, 906, 908, 910, direct the splicing detection and control mechanism 112 in communications system 100 to perform detecting and controlling data stream splicing in a stream of multimedia digital data across ATM networks.

In brief, the splicing detection and control mechanism 112 can either be implemented in program code 904, 906, 908, 910 on the medium 902 or hardware logic 112 as illustrated and described with reference to FIGS. 2A, 2B, 3, and 4. Given that ATM is a fast protocol, a hardware implementation 112 typically is more efficient. Either implementation involves reconstructing the transport stream packet, interrogating the associated fields, determining that a splice had occurred, and initiating a predetermined task.

While the present invention has been described with reference to the details of the embodiments of the invention shown in the drawing, these details are not intended to limit the scope of the invention as claimed in the appended claims.

What is claimed is:

1. A method for detecting and controlling data stream splicing across data communications networks comprising the steps of:

obtaining sequential transport stream packets;

interrogating predetermined fields of each transport stream packet to identify a splice in the data stream; wherein the data stream is a MPEG-2 data stream and said interrogating step including the steps of interrogating a continuity counter and comparing a current continuity counter value with a last continuity counter value and identifying said splice in the data stream responsive to a predetermined difference between said current continuity counter value and said last continuity counter value; and initiating a predetermined task responsive to an identified splice;

wherein the data stream is a MPEG-2 data stream and wherein said step of interrogating predetermined fields of each transport stream packet to identify a splice in the data stream includes the step of checking a splice countdown indicator for each transport stream packet;

further includes the steps of saving an identified splice countdown value and a PID field for an identified transport stream packet containing said splice countdown indicator;

checking said PID field for a next transport stream packet, and responsive to an identified different PID, obtaining a next transport stream packet and checking said PID field for said next transport stream packet;

responsive to an identified matching PID, decrementing said splice countdown value and comparing a resulting splice countdown value with zero.

2. A method for detecting and controlling data stream splicing across data communications networks as recited in claim 1 further includes the step of identifying said splice in the data stream responsive to an identified matching zero splice countdown value.

3. A method for detecting and controlling data stream splicing across data communications networks as recited in claim 1 wherein said step of initiating said predetermined task responsive to said identified splice includes the step of buffering a spliced stream.

4. A method for detecting and controlling data stream splicing across data communications networks comprising the steps of:

obtaining sequential transport stream packets;

interrogating predetermined fields of each transport stream packet to identify a splice in the data stream;

initiating a predetermined task responsive to an identified splice;

said step of initiating said predetermined task responsive to said identified splice includes the step of masking said interrogated predetermined fields of an identified transport stream packet to mask said splice in the data stream;

wherein said masking step includes the steps of identifying private data present; clearing a splice point flag; collapsing a splice countdown field; incrementing a private data length value; copying private data shifted by said collapsed splice countdown field; and inserting fill bits to pad for said collapsed splice countdown field; and responsive to identifying an absence of private data, clearing said splice point flag; clearing a last splice countdown field and establishing a transport private data length set to zero.

5. A method for detecting and controlling data stream splicing across data communications networks comprising the steps of:

obtaining sequential transport stream packets;

interrogating predetermined fields of each transport stream packet to identify a splice in the data stream; wherein the data stream is a MPEG-2 data stream and said interrogating step including the steps of interrogating a continuity counter and comparing a current continuity counter value with a last continuity counter value and identifying said splice in the data stream responsive to a predetermined difference between said current continuity counter value and said last continuity counter value; and initiating a predetermined task responsive to an identified splice;

wherein said step of initiating said predetermined task responsive to said identified splice includes the steps of checking for a present adaptation block; responsive to an identified present adaptation block checking for a present program clock reference (PCR); responsive to an identified PCR checking for a present discontinuity indicator; and responsive to an identified present discontinuity indicator, resetting said discontinuity indicator, calculating a updated correction value for said PCR and setting said PCR with said calculated updated correction value.

6. A method for detecting and controlling data stream splicing across data communications networks as recited in claim 5 further includes the steps responsive to an identified absence of a discontinuity indicator, setting said PCR with a current correction value.

7. A method for detecting and controlling data stream splicing across data communications networks comprising the steps of:

obtaining sequential transport stream packets;

interrogating predetermined fields of each transport stream packet to identify a splice in the data stream; wherein the data stream is a MPEG-2 data stream and said interrogating step including the steps of interrogating a continuity counter and comparing a current continuity counter value with a last continuity counter value and identifying said splice in the data stream responsive to a predetermined difference between said current continuity counter value and said last continuity counter value; and initiating a predetermined task responsive to an identified splice;

wherein said step of initiating said predetermined task responsive to said identified splice includes the step of deleting the spliced data stream.

8. A method for detecting and controlling data stream splicing across data communications networks as recited in claim 7 wherein said step of interrogating predetermined fields of each transport stream packet to identify a splice in the data stream includes the step of checking a splice countdown indicator for each transport stream packet.

9. A method for detecting and controlling data stream splicing across data communications networks as recited in claim 7 includes the steps of identifying user selections to control identifying said splice and identifying user selections to select said predetermined tasks.

10. A method for detecting and controlling data stream splicing across data communications networks comprising the steps of:

obtaining sequential transport stream packets;

interrogating predetermined fields of each transport stream packet to identify a splice in the data stream; wherein the data stream is a MPEG-2 data stream and said interrogating step including the steps of interrogating a continuity counter and comparing a current continuity counter value with a last continuity counter value and identifying said splice in the data stream responsive to a predetermined difference between said current continuity counter value and said last continuity counter value; and initiating a predetermined task responsive to an identified splice;

wherein said step of initiating said predetermined task responsive to said identified splice includes the step of substituting another data stream for the spliced data stream.

11. A method for detecting and controlling data stream splicing across data communications networks as recited in claim 10 wherein said predetermined difference is a value greater than two.

12. Apparatus for detecting and controlling data stream splicing across data communications networks comprising:

means for obtaining sequential transport stream packets from the data streams;

means for interrogating predetermined fields of each transport stream packet to identify a splice in the data stream;

means for initiating a predetermined task responsive to an identified splice;

means for receiving user selections to control said means for identifying said splice; and means for receiving user selections to select said predetermined tasks;

wherein said means for initiating said predetermined task responsive to said identified splice include means for masking said interrogated predetermined fields of an identified transport stream packet to mask said splice in the data stream.

* * * * *

UNITED STATES PATENT AND TRADEMARK OFFICE
CERTIFICATE OF CORRECTION

PATENT NO. : 6,067,303
DATED : May 23, 2000
INVENTOR(S) : Kenneth Dale Aaker, Gary Scott Delp, David Richard Poulter and Albert Alfonse Slane It is certified that error appears in the above-identified patent and that said Letters Patent is hereby corrected as shown below:

On the Title Page:

Item [56] Attorney, Agent, or Firm "John Pennington" should be --Joan Pennington--

Signed and Sealed this

Twenty-seventh Day of March, 2001

Attest:

NICHOLAS P. GODICI

Attesting Officer

Acting Director of the United States Patent and Trademark Office